Dec. 1, 1953 R. H. BLOXHAM 2,660,962
BLOCK ICE-CREAM SLICER
Filed May 23, 1951 4 Sheets-Sheet 1

INVENTOR.
Ralph H. Bloxham

Dec. 1, 1953 R. H. BLOXHAM 2,660,962
BLOCK ICE-CREAM SLICER
Filed May 23, 1951 4 Sheets-Sheet 3

INVENTOR.

Ralph H. Bloxham

Dec. 1, 1953 R. H. BLOXHAM 2,660,962
BLOCK ICE-CREAM SLICER
Filed May 23, 1951 4 Sheets-Sheet 4

INVENTOR.
Ralph H Bloxham

Patented Dec. 1, 1953

2,660,962

UNITED STATES PATENT OFFICE 2,660,962

BLOCK ICE-CREAM SLICER

Ralph H. Bloxham, near Theodore, Ala.

Application May 23, 1951, Serial No. 227,919

2 Claims. (Cl. 107—1)

The present invention relates to improvements in block ice cream slicers and has for its main object and purpose to provide an efficient and hygienic method of cutting an ice cream block.

One of the foremost advantages found in my new invention resides in the time saved. A mould or block of ice cream contains two gallons which is cut through the center longitudinally and from 31 to 23 times horizontally to make either 64 or 48 slices. By using the old method of cutting these ice cream blocks, four people were needed to cut 4 blocks per hour, place the slices of ice cream between cookies in the manner of a sandwich, and bag them. With my new method of cutting these ice cream blocks it is possible to accomplish three to four times that much, or approximately 12 to 15 blocks per hour which includes the placing of the cookies and bagging. This, of course, allows a much smaller production cost.

Another advantage which allows a saving is the accuracy of this new machine. By being accurate, and through the use of Dry Ice very little loss results from improperly sliced sections or melted sections.

Another important improvement provided by my new invention, having a bearing on sales, is that the ice cream sandwiches have a much better appearance. The slices are uniform, and do not have a chance to melt before being placed in the cooler, and since the cookies are not subjected to soft ice cream they remain crisp and fresh.

From a health standpoint this machine has definitely improved conditions under which these ice cream sandwiches are made. The ice cream does not come in contact with human hands at any time, nor does it touch any part of the machine with the exception of a Monel metal or stainless steel tray which lifts the cut slices individually away from the ice cream block. This tray is easily kept sterilized.

This new block ice cream slicer can be manufactured at a much lower cost than any machines now on the market which are used for the same purpose, and at the same time it provides a much more economical, efficient, and hygienic means of slicing blocks of ice cream.

With these and other advantages to be pointed out as we proceed, I refer to the drawings in which like parts are denoted by the same reference characters throughout the several views.

This new invention is designed to perform four distinct functions. One: The ice cream mould or block is moved longitudinally the proper distance to allow the cutter to make the desired thickness of cut. Two: The cutter blade is caused to cut the block of ice cream at the proper time. Three: The slices are lifted away from the blade when cut. Four: The cookies are raised to a level within the holders to allow them to be reached with ease at all times.

All of these functions are accomplished through the application of cams or eccentrics on the shaft which runs longitudinally within the machine.

The frame 11 consists of angle or bar iron welded together. Various parts of the mechanism are attached thereto and to indicate that the frame is used in each instance the numeral 11 will be used throughout with the addition of one letter of the alphabet in each separate instance to more clearly define the particular part of the frame.

Figure 3:
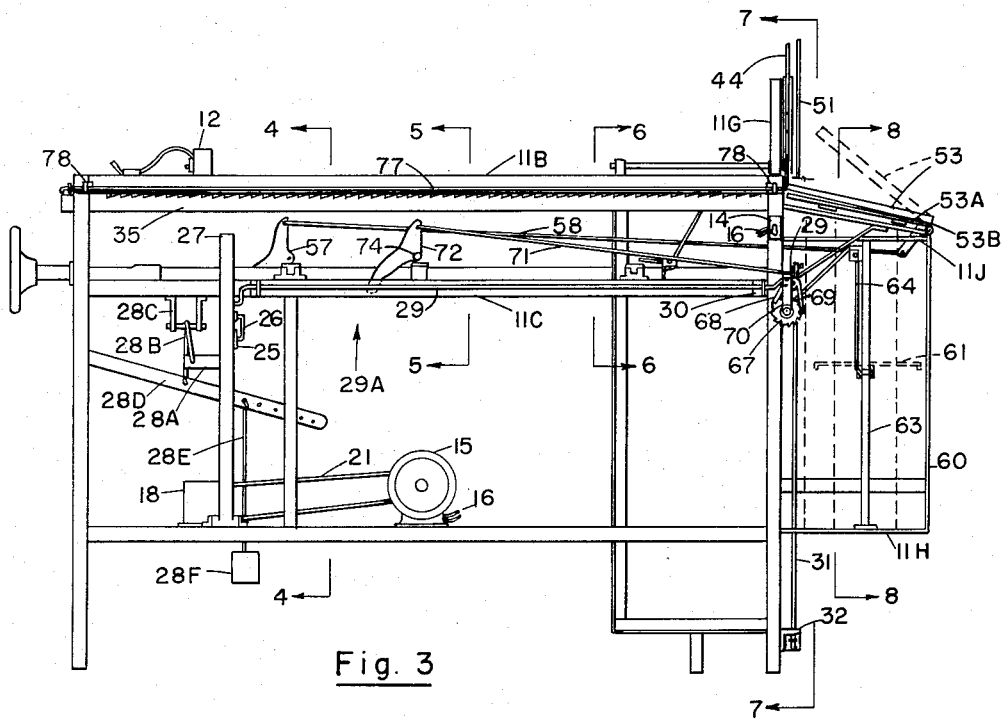
Figure 3 is a side elevation taken in the direction of arrow 3 in Figure 1.
Figure 8:
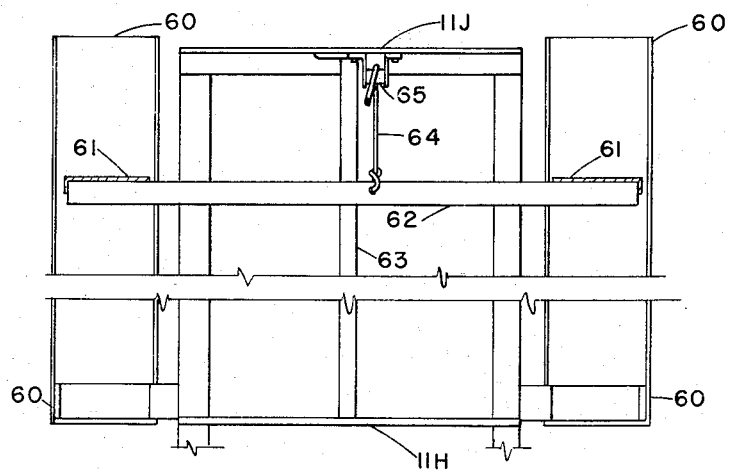
Figure 8 is a vertical section taken at 8—8 in Figure 3.
Figure 7:
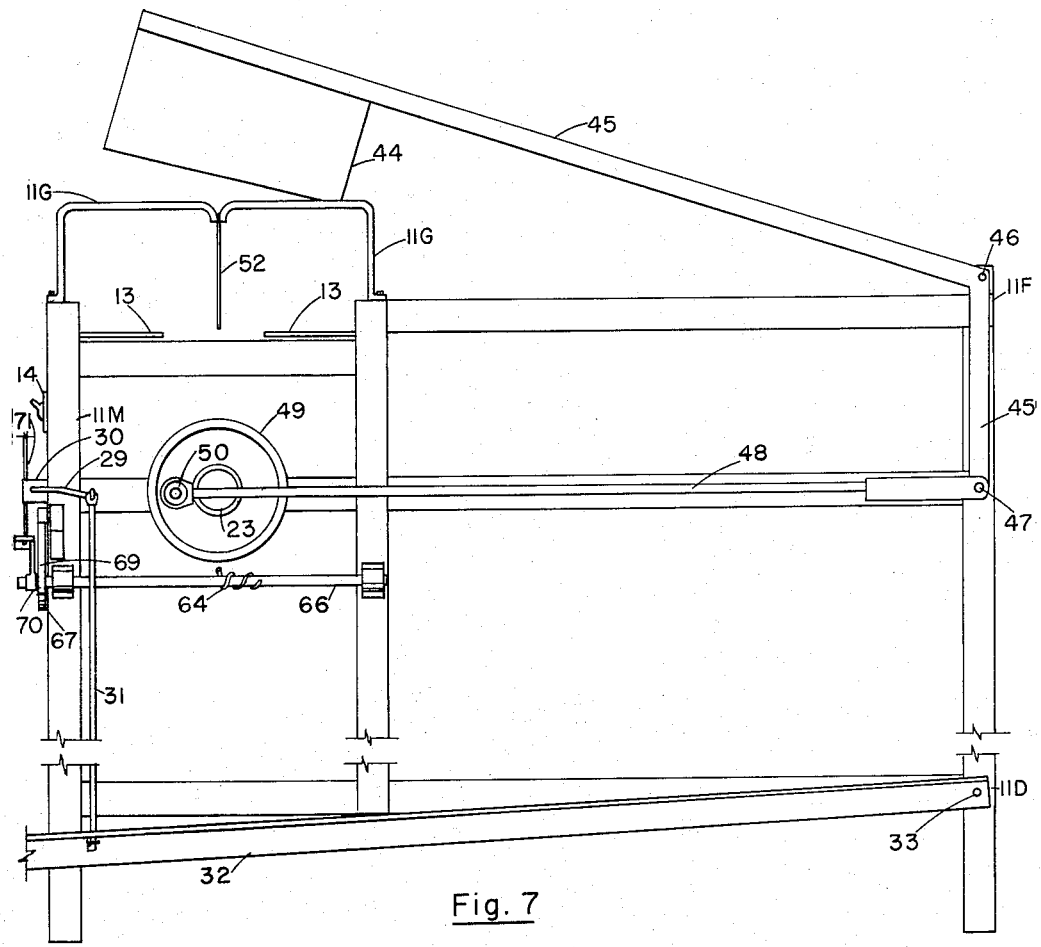
Figure 7 is a vertical section taken at 7—7 in Figure 3.

Block ice cream is made, as stated above, to allow from 24 to 32 slices in a double row. Only one adjustment is needed to change the number of slices. Since the ratchet controls the number of slices made per block a different longitudinal ratchet would have to be used when the number of slices is changed. When frozen, the block of ice cream is covered on all sides with paper. Before placing one of these blocks in the slicing machine the side, top and one end paper are removed, while the bottom paper and one end paper which abuts a pusher board are left on the block. It is then placed between the angle irons 11A and 11B (Fig. 1) with the end having the paper resting against the pusher board 12. Between 11A and 11B are two flat irons 13 which run the full length of the frame, although they are shown broken away in Figure 1. The switch 14, which is secured to upright member 11M of frame 11 as shown in Figures 3 and 7, is closed and electricity is thus allowed to reach the motor 15 through the wires 16. Since the motor 15 has a greater speed than is desired, down-gearing is accomplished through the application of a pulley 17 on the motor 15 and a gear box 18 provided with two pulleys 19 and 20. Pulleys 17 and 19 are connected by the pulley belt 21, and pulley 20 is connected to a pulley 22, on the shaft 23, by pulley belt 24. This pulley belt 24 is loosely placed on the pulleys 22 and 20, requiring the action of a roller 25 against the pulley belt 24 to tighten it sufficiently to allow the pulley 20 and the pulley belt 24 to turn the pulley 22, and thus the shaft 23.

Figure 1:
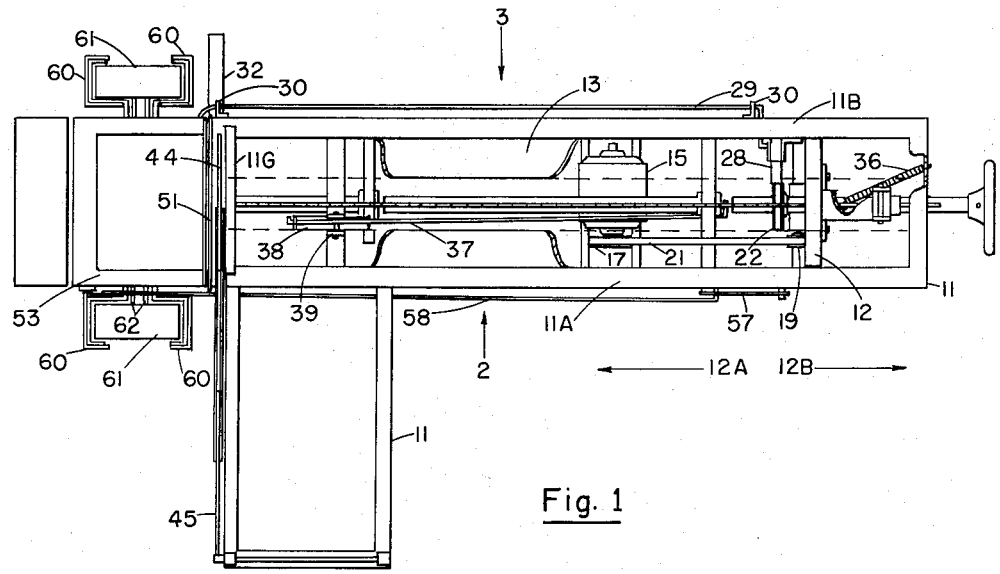
Figure 1 is a plan view of my new invention as embodied in a block ice cream slicer.
Figure 4:
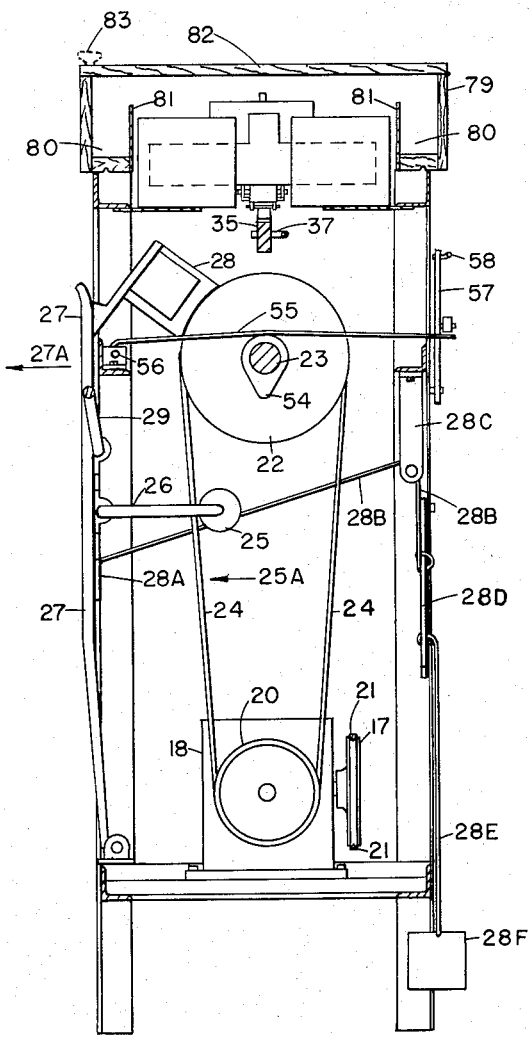
Figure 4 is a vertical section taken at 4—4 in Figure 3.
Figure 5:
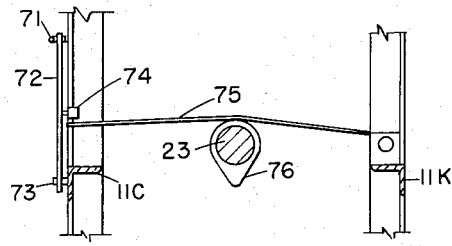
Figure 5 is a vertical section taken at 5—5 in Figure 3.

Referring more particularly to Figures 4 and 7, the tightening of the pulley belt 24 is accomplished through the application of the roller 25 which, as viewed in Figure 4, is pulled toward the left in the direction indicated by the arrow 25A. The roller 25 is attached to a hinged holder bar 26 which, in turn, is attached to a brake lever 27. As seen in Figure 4 this brake lever 27 is provided with four attachments, the topmost attachment being a brake shoe 28 which causes the shaft 23 to remain stationary when the machine is not in operation. This shoe 28 acts against the pulley 22. Just below the brake shoe 28 is shown a partial view of a rod 29, as seen in Figure 4. In Figures 1, 3 and 7 the rod 29 is shown pivoted to the angle iron 11C through the use of brackets 30. After leaving the bracket 30 on the right end of angle 11C, as viewed in Fig. 3, the rod 29 angles outward where it is connected to a vertical rod 31 (Fig. 7). The vertical rod 31 is connected at its lower end to an operating lever 32, which is fulcrumed at 33 to angle 11D. The pressure of the foot on the lever 32 causes the rod 31 to be pulled downward thus causing the end of rod 29 to be moved in a downward manner. The rod 29 is caused to turn radially in the direction indicated by the arrow 29A seen in Figure 3. Through this radial movement of the rod 29, and the application of the brackets 30, the end of the rod 29 which is attached to the brake lever 27 is caused to move outward in the direction indicated by the arrow 27A seen in Figure 4. This outward movement of the rod 29 causes the brake lever 27 to also move outward causing the brake shoe 28 to release the pulley 22, and at the same time creating a tension against the pulley belt 24 by the roller 25. The shaft 23 is thus caused to rotate. On the other hand, the release of the operating lever 32 causes the brake lever 27 to again apply the brake shoe 28 to the pulley 22, the roller 25 releases the pulley belt 24, and the shaft 23 stops rotating.

The fourth attachment to the brake lever 27 is shown as consisting of an arm 28A to which is attached a wire 28B which passes over a roller bracket 28C thence downward where it is attached to a hinged arm 28D. This arm 28D is provided with another wire 28E which carries a weight 28F. These parts combined serve the purpose of holding the brake shoe 28 firmly against the pulley 22 until the operating lever 32 releases it. The outward movement of the brake lever 27 causes the wire 28B to lift the arm 28D and thus the weight 28F. When the lever 32 is released the weight 28F causes the brake shoe 28 to again press against the pulley 22.

Thus it may be seen that the complete operation of the machine is controlled by the operating lever 32 since it allows the shaft 23 to rotate and all the mechanical movements are controlled on the shaft 23.

Figure 2:
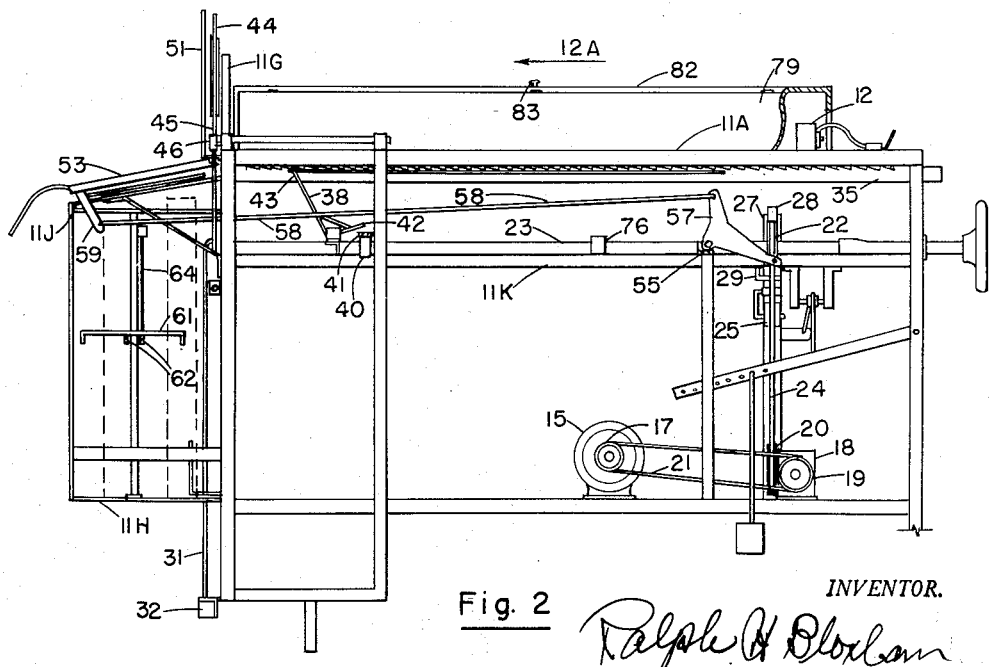
Figure 2 is a side elevation taken in the direction of arrow 2 in Figure 1.
Figure 6:
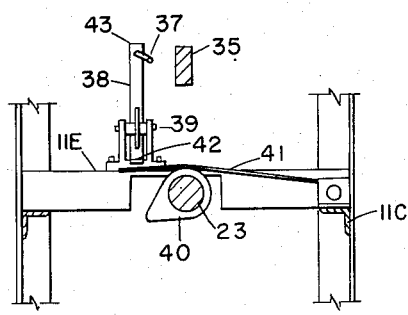
Figure 6 is a vertical section taken at 6—6 in Figure 3.
Figure 9:
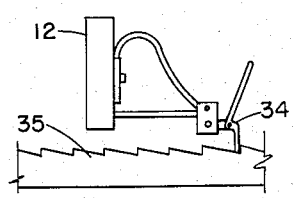
Figure 9 is a fragmentary view of the longitudinal ratchet showing more clearly the ratchet and pawl assembly.

After the ice cream block is placed between the angles 11A and 11B on the flat irons 13, it is caused to move in the direction indicated by the arrow 12A (Fig. 1) through the application of the pusher board 12. This pusher board 12 is provided with a pivoted pawl 34, seen more particularly in Figure 9, which falls against one of the teeth of the longitudinal ratchet 35 as it is pulled in the direction of the arrow 12B (Fig. 1), through the action applied by the spring 36. Referring to Figures 2 and 6, the ratchet 35, which is slidably mounted in the ends of frame 11, is then moved in the direction indicated by arrow 12A (Fig. 2) by a rod 37 pivotally attached (Fig. 1) to the ratchet 35 and to an L-shaped lever 38 which is fulcrumed at point 39 of a bracket attached to angle 11E. A cam 40 operating through the rotation of the shaft 23, previously explained, causes the bar lever 41, hinged to angle 11C, to be raised and lowered on its free end which, in turn, causes the end 42 of the lever 38 to be raised and the end 43 of lever 38 is then caused to move in the direction indicated by the arrow 12A. The attached rod 37 thus pulls the ratchet 35 in the direction indicated by arrow 12A which also causes the pusher board 12 to move in the same direction through the operation of the pawl 34.

In Figure 7 the cutter blade 44 is attached to an L-shaped arm 45 which is fulcrumed at 46 to the angle 11F. At point 47 a horizontal arm 48 is hingedly mounted to the arm 45 at one end and at the other end to a wheel 49, used as an eccentric, by use of a bearing 50. The wheel is caused to rotate through the rotation of the shaft 23 to which it is attached, and the bearing end of the arm 48 rotates around the hub of the wheel 49 causing the arm 48 to move backward and forward horizontally, thus causing the blade 44 to ascend or descend, as the case may be. The vertical cutter blade 52 is attached to the bars 11G, and performs the longitudinal cut of the ice cream block. To prevent accidents, a plate 51 is provided and attached to the frame by welding or similar means to act as a shield for the cutter blade.

When the cutter blade 44 has made one cut, two slices of ice cream rest momentarily on a lifter pan 53, the raised position being shown in dashed lines in Figure 3. The slices of ice cream tend to adhere to the pan 53 with the result that they remain in an upright position. As the pan 53 is raised, the operation to be explained as we proceed, it is very easy to pick up two cookies, place them simultaneously on either side of each ice cream slice, and place the completed sandwich on a tray or table close by. Thus two people, one on each side of the lifter pan 53, may easily complete the sandwiches before the next slices are ready.

The operation of the lifter pan 53 may be more clearly seen in Figures 2 and 4. A cam 54 attached to the shaft 23, causes the lever 55, hinged at 56, to lift the lever 57. A rod 58 is attached at one end to the lever 57 and at the other end (Fig. 2) to a bracket 59 which is, in turn, attached to the lifter pan 53. The action of the cam 54 lifting the lever 55 and thereby the lever 57, causes the rod 58 to pull the bracket 59 thus causing the hinged lifter pan 53 to be raised as shown with dash lines in Figure 3.

In Figures 1, 3, 5, and 8, is shown the mechanism governing the operation of each lifting device for the cookies. A frame 60 is provided to enclose the cookies which are placed on a tray 61 which is attached to two horizontal bars 62 (Fig. 2) which pass on either side of a vertical rod 63. This vertical rod 63 is attached to bar 11H at the bottom, and 11J at the top. These bars 62 move vertically along the rod 63 through the attachment of a metal wire 64 which passes upward and over a roller 65 and thence to a shaft 66 (Fig. 7) where it is attached. In Figures 3 and 7, a ratchet wheel 67 is attached to one end of the shaft 66. Two pawls 68 and 69 are used. The pawl 68 is pivotally attached to a handle 70 and is used to turn the ratchet wheel 67. Pawl 69, which has a curved end to engage the teeth of ratchet 67, is pivoted on frame angle 11M and is used to retard the ratchet 67. The handle 70 is pivotally attached to the shaft 66, and this handle or lever 70 is in turn attached to a rod 71 which is attached at its other end to a lever 72. The lever 72 (Fig. 5) is hingedly attached at 73 to angle 11C and is provided with a roller 74. A lever 75 hingedly attached to angle 11K is caused to lift upward on its free end, through the action of a cam 76 attached to the shaft 23. The lifting of the lever 75 causes the roller 74 to be pushed upward thus causing the rod 71 to be pulled. The handle 70 is thus pulled, and causes the pawl 68 to turn the ratchet wheel 69. When the lever 75 is again lowered, the handle 70 is allowed to resume its upright position through the push of the rod 71 against it. The pawl 69 serves the purpose of stopping the movement of the ratchet wheel 67, and thus the rod 66.

It should be understood that the cams and eccentric are timed to function at the proper time. The block of ice cream must first be moved, then cut, then lifted away from the cutter blade individually as the slices are cut, and the cakes must be kept near or at the top of the frame 60. This is all accomplished through the timed action of all the cams and eccentric.

When the tray or pan 53 is raised upward, the frame 53A, whereupon pan 53 normally rests, stays in the position shown in Figure 3. The pan 53 is provided with a sharp edge on its free side next to the cutter blade 44. A rod 77 attached by brackets 78 to the angle 11B is for the purpose of causing the free end of the tray or pan 53 to be placed in the proper position to allow the sharp edge to cut the bottom paper away from the ice cream block. This is accomplished by pushing the rod 77 toward the pan 53 where the end of the rod 77 enters between the frame 53A and the pan 53 causing the latter to assume the proper position. It is necessary to do this only before the first slice is cut from each block, because after the paper is started between the frame 53A and the pan 53 it will continue to move forward as the block moves, and will emerge at point 53B (Fig. 3). The cutter blade is in position so as to not cut the paper.

A box 79 is provided to be placed over the top of the slicing machine on the angles 11A and 11B (Fig. 1). This box 79 (Figs. 2 and 4) is provided with two spaces 80 in which Dry Ice is placed to assist in keeping the ice cream from melting. Two shield bars 81 prevent the Dry Ice from coming into contact with the ice cream blocks. A lid 82 and knob 83 are provided to allow access within the box for placement of the Dry Ice. The box 79 is not attached to the slicing machine but is merely placed thereon, and the Dry Ice placed within the spaces 80. The ice cream blocks may be placed on the machine without the removal of the box 79, or the box may be placed over the ice cream after it has been placed on the machine. The lid 82 is kept closed during operation to allow the Dry Ice to assist in keeping the ice cream from melting.

While I have disclosed herein the best form of the invention known to me at the present time, I desire it to be understood that I reserve the right to make alterations and changes insofar as such alterations and changes are covered by the following claims.

What I claim is:

1. An ice cream slicing machine consisting of an angle iron and bar iron frame, a shaft mounted upon the frame, a series of cams and an eccentric mounted on the shaft, motive means attached to the frame to provide movement for the shaft, a longitudinal ratchet controlled by one of the said cams for moving the ice cream block, a movable cutter controlled by said eccentric for slicing the ice cream block horizontally, a cutter attached to the said frame to make the longitudinal slicing of the ice cream block, a lifter tray controlled by a second of said cams for lifting the individual slices away from the moveable cutter, a holder for cookies attached to the frame, and means controlled by the third of said cams for keeping a high level of cookies in the holder.

2. An automatic machine for cutting ice cream blocks into slices, said slices to be used with cookies to make ice cream sandwiches, said machine provided with a frame, a shaft mounted on said frame, an electric motor attached to the frame to supply power to the shaft, a reduction gear box, means connecting said motor to said gear box, driving means connecting said gear box to said shaft, means provided to control said shaft through the said driving means, cams and an eccentric attached to said shaft, a longitudinal ratchet operated by one of said cams, a pawl engaging said ratchet, said pawl attached to a pusher board mounted on the frame, said pusher board thereby moving the block of ice cream, a cutter blade controlled by said eccentric for cutting the ice cream blocks, a lifter tray controlled by another of said cams for lifting the individual slices away from the ice cream block when cut by the cutters, a holder for said cookies attached to the frame, means controlled by a third of said cams for keeping the unused cookies at the top of said holder, and a box removably mounted on the top of said frame, said box provided with means whereby Dry Ice may be placed therein to keep the ice cream at a low temperature while being sliced.

RALPH H. BLOXHAM.

References Cited in the file of this patent

UNITED STATES PATENTS

| Number | Name | Date |
|---|---|---|
| 1,309,643 | Leich et al. | July 15, 1919 |
| 1,325,726 | Kuhn | Dec. 23, 1919 |
| 1,440,686 | Larson | Jan. 2, 1923 |
| 1,661,533 | Gantz | Mar. 6, 1928 |
| 1,755,699 | Loehr | Apr. 22, 1930 |
| 1,798,560 | Saetta | Mar. 31, 1931 |